United States Patent
Senegas et al.

(10) Patent No.: US 7,822,246 B2
(45) Date of Patent: Oct. 26, 2010

(54) METHOD, A SYSTEM AND A COMPUTER PROGRAM FOR INTEGRATION OF MEDICAL DIAGNOSTIC INFORMATION AND A GEOMETRIC MODEL OF A MOVABLE BODY

(75) Inventors: Julien Senegas, Hamburg (DE); Cristian Lorenz, Hamburg (DE); Thomas Netsch, Hamburg (DE); Heiner Gunnar Konrad Lund, Hamburg (DE); Alexander Stork, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 809 days.

(21) Appl. No.: 11/721,171

(22) PCT Filed: Dec. 16, 2005

(86) PCT No.: PCT/IB2005/054289
§ 371 (c)(1),
(2), (4) Date: Jun. 8, 2007

(87) PCT Pub. No.: WO2006/067719
PCT Pub. Date: Jun. 29, 2006

(65) Prior Publication Data
US 2009/0232369 A1 Sep. 17, 2009

(30) Foreign Application Priority Data
Dec. 20, 2004 (EP) .................................. 04106709

(51) Int. Cl.
*G06K 9/00* (2006.01)
*A61B 5/05* (2006.01)
(52) U.S. Cl. ..................... 382/128; 382/274; 600/407
(58) Field of Classification Search ........... 382/100, 382/128, 129, 130, 131, 132, 133, 134, 154, 382/168, 181, 232, 254, 255, 274, 276, 291, 382/305, 312; 600/410, 407, 427; 434/262; 356/622; 378/4, 20, 23
See application file for complete search history.

(56) References Cited

U.S. PATENT DOCUMENTS
5,920,395 A * 7/1999 Schulz ...................... 356/622
(Continued)

FOREIGN PATENT DOCUMENTS
EP 1182619 A2 2/2002

OTHER PUBLICATIONS
Bray, M. A., et al.; Three-Dimensional Surface Reconstruction and Fluorescent Visualization of Cardiac Activation; 2000; IEEE Trans. on Biomedical Engineering; 47(10)1382-1391.
(Continued)

*Primary Examiner*—Seyed Azarian

(57) ABSTRACT

The system 10 comprises an input 2 for accessing the suitable input data. The core of the system 10 is formed by a processor 4 which is arranged to operate the components of the system 10, it being the input 2, a computing unit 5, a working memory 6. The computing unit 5 preferably comprises a suitable number of executable subroutines 5a, 5b, 5c, 5d, 5e, and 5f to enable a constructing of a geometric model of the movable body based on the results of the segmentation step, finding a spatial correspondence between the first and second image dataset, mapping the texture image dataset on geometric model, fusing the geometric model and the mapped texture image dataset. The apparatus 10 according to the invention further comprises a coder 7 arranged to code the determined region of interest in accordance to a pre-selected criterion. The criterion may be selectable from a list of valid criteria, stored in a file 7a. Preferably, the coder 7, the computing unit 5 and the processor 4 are operable by a computer program 3, preferably stored in memory 8. An output 9 is used for outputting the results of the processing, like fused image data representing the textured, preferably animated geometric model of the movable body. The invention further relates to a method for integration of medical diagnostic information and a geometric model of a movable body and to a computer program.

19 Claims, 6 Drawing Sheets

U.S. PATENT DOCUMENTS

Figure 1:
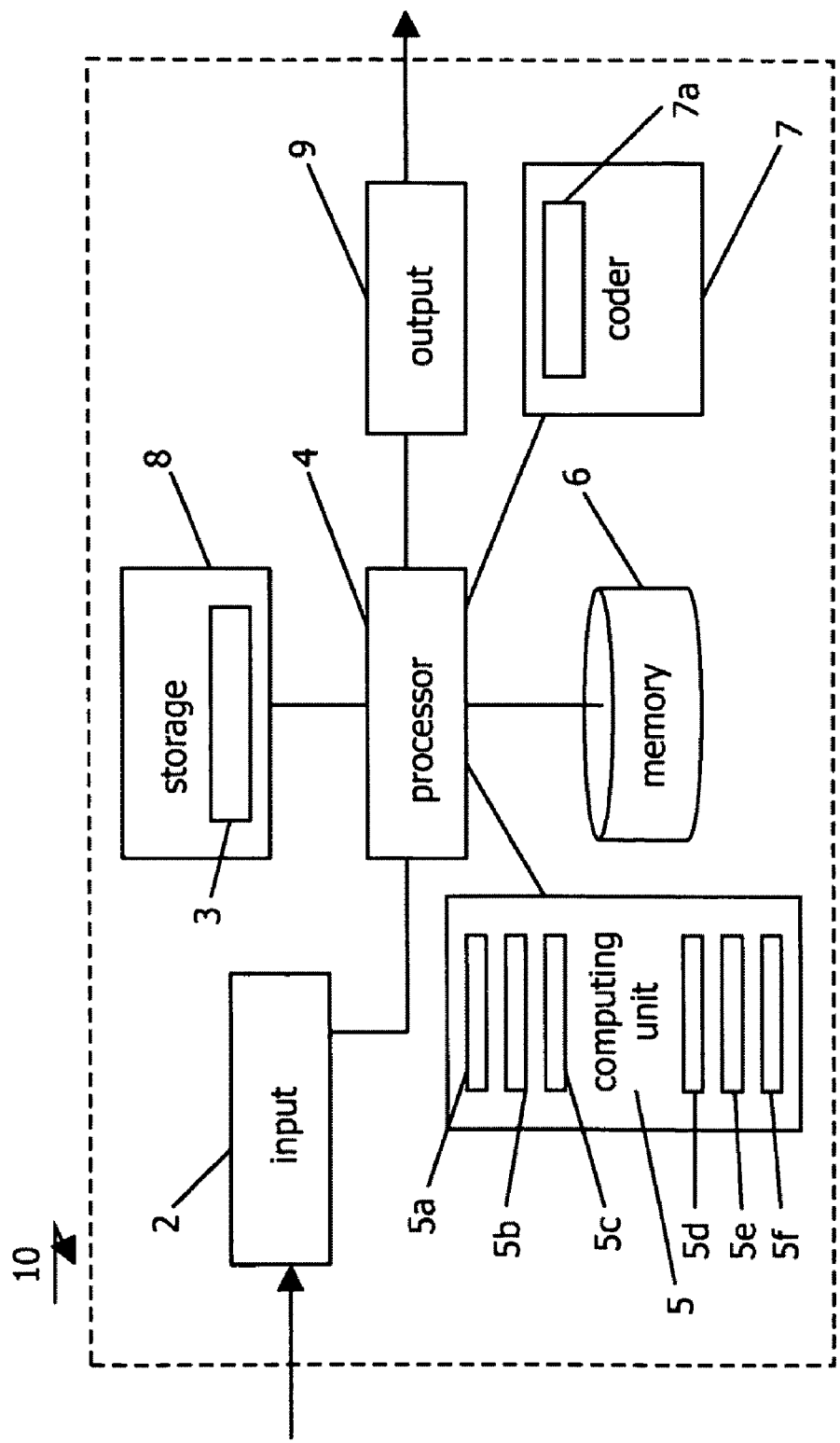

| | | | |
|---|---|---|---|
| 7,107,090 B2* | 9/2006 | Salisbury et al. | 600/427 |
| 7,371,067 B2* | 5/2008 | Anderson et al. | 434/262 |
| 7,693,563 B2* | 4/2010 | Suresh et al. | 600/407 |
| 2003/0065258 A1* | 4/2003 | Gupta et al. | 600/410 |
| 2004/0052409 A1* | 3/2004 | Bansal et al. | 382/128 |
| 2004/0066961 A1* | 4/2004 | Spreeuwers et al. | 382/128 |

OTHER PUBLICATIONS

Delibasis, K. K., et al.; MR functional cardiac imaging: Segmentation, measurement and WWW based visualisation of 4D data; 1999; Future Generations Computer Systems; Elsevier; 15(2)185-193.

Faber, T. L., et al.; Three-Dimensional Fusion of Coronary Arteries with Myocardial Perfusion Distributions: Clinical Validation; 2004; J. of Nuclear Medicine; 45(5)745-753.

Gerard, O., et al.; Efficient Model-Based Quantification of Left Ventricular Function in 3-D Echocardiography; 2002; IEEE Trans. on Medical Imaging; 21(9)1059-1068.

Guttman, M. A., et al.; Analysis of Cardiac Function from MR Images; 1997; IEEE Computer Graphics and Applications; 17(1)30-38.

Matheny, A., et al.; The Use of Three-and Four-Dimensional Surface Harmonics for Rigid and Nonrigid Shape Recovery and Representation; 1995; IEEE Trans. on Pattern Analysis and Machine Intelligence; 17(10)967-981.

McInerney, T., et al.; Deformable Models in Medical Image Analysis: A Survey; 1996; Medical Image Analysis;1(2)1-26.

Maintz, J. B. A., et al.; A survey of medical image registration; 1998; Medical Image Analysis; 2(1)1-36.

Positano, V., et al.; Automatic Time Sequence Alignment in Contrast Enhanced MRI by Maximization of Mutual Information; 2001; IEEE Proc. EMBS Int'l. Conf.;pp. 2407-2410.

Senegas, J., et al.; Segmentation of Medical Images with a Shape and Motion Model: A Bayesian Perspective; 2004; LNCS; 3117; pp. 157-168.

* cited by examiner

METHOD, A SYSTEM AND A COMPUTER PROGRAM FOR INTEGRATION OF MEDICAL DIAGNOSTIC INFORMATION AND A GEOMETRIC MODEL OF A MOVABLE BODY

The invention relates to a method for integration of medical diagnostic information and a geometric model of a movable body based on a first dataset comprising shape and motion information about the movable body and a second dataset comprising medical diagnostic information about the movable body.

The invention further relates to a system for enabling an integration of medical diagnostic information and a geometric model of a movable body based on a first dataset comprising shape and motion information about the movable body and a second dataset comprising medical diagnostic information about the movable body.

The invention still further relates to a computer program.

It is common for the diagnosis of cardio-vascular diseases to acquire a cine scan and a contrast-enhanced scan of the heart. For example, these datasets can be acquired with a Magnetic Resonance Imaging scanner. The cine scan consists of a series of image volumes, each volume being made of a stack of two-dimensional slices, over a complete cardiac cycle. Typically, 10 to 30 heart phases are acquired, and each volume is made of approximately 10 to 20 slices. With such a cine scan, it is possible to visualize and analyze both the anatomy of the myocardium (and especially of the endocardium and epicardium of the left ventricle and/or right ventricle) and its motion (contraction during the systolic phase and expansion during the diastolic phase). The contrast enhanced scan is made of a time series of a stack of slices and is used to monitor the passage in the blood and the organs of a contrast agent, which has been injected in the blood vessels of the patient. Preferably, each image of the time series is acquired at the same instant of the heart cycle, to minimize artifacts due to the cardiac motion. Another practice consists in acquiring a single contrast-enhanced image or volume (no time series) after a certain amount of time after the injection of the contrast agent (delayed enhancement scan). Such contrast enhanced scans are used to analyze and quantify the perfusion status of the cardiac muscle and to detect ischemic areas.

Both types of scans need to be manually or automatically processed to yield a dataset, suitable to be used by medically skilled person to establish a diagnosis. Generally, in clinical practice, at least the end-diastolic (ED) and end-systolic (ES) phases of the cardiac cine scan are segmented manually or using some semi-automatic computer program. This segmentation step preferably comprises the steps of delineating the contours of the endocardium and epicardium of the left and/or right ventricle in each slice of the ED and ES phases. Then, these delineated contours are used to compute functional parameters such as the left-ventricular myocardial mass, blood volume, stroke volume and ejection fraction. They may also be used to compute locally the wall thickening of the myocardium during the cardiac cycle.

The processing of a contrast-enhanced scan yields valuable medical diagnostic information, like a map of the perfusion status of the myocardium. For example, a common method for the analysis of first-pass enhancement scans consists in first registering together the consecutive images of the temporal series in order to correct for breathing and remaining cardiac motion, and computing pixel-wise a parameter relative to the intensity change due to the passage of the contrast agent. Thus, for each slice such a parameter image can be computed and supports the analysis of the ischemic areas. A method for computing perfusion parameter from a perfusion scan is described in US2004/0066961 A1.

It is a disadvantage of the common general practice that it requires an interaction with an operator in order to determine possible regions of ischemia, obstruction, areas of infarction, etc. For this purpose the medically skilled person must examine and compare functional image dataset, like a cine scan, and contrast-enhanced images, both image datasets being four-dimensional. Especially the step of manually segmenting all the images of the cine scan is very time-consuming and cannot be done in clinical practice. Thus, the common general practice is laborious, user-dependent and may be subject to errors due to a human factor. Moreover, with the common general practice, each type of scan is analyzed independently and it is not possible to exactly establish the spatial correspondence between the findings of the cine scan and those of the contrast-enhanced scan. Therefore, there is a persisting need for a method of integration of medical diagnostic dataset with a dataset representative of a geometry of the movable body, notably using a geometric model thereof.

An embodiment of the method as is set forth in the opening paragraph is known from EP 1 182 619 A2. In the known method an image of a structure in a body of a subject comprising medical diagnostic information, is mapped to a geometric model of the structure, whereby the geometric model is obtained using a probe inserted into the structure. In order to enable an anatomically correct visualization, the image of the structure is registered with the geometric model, such that each of the plurality of image points in the model is identified with a corresponding point in the image. In order to construct the model of the structure, notably the heart, in the known method use is made of the probe with a plurality of sensors which provide respective signals in accordance with their position with respect to an external magnetic field into which the structure is placed. By this method a location of the sensors arranged on the probe with respect to an external reference sensor is established. By comparing the position of the probe to the position of the reference sensor the coordinates of the probe are determined, irrespective of the motion of the body, notably the heart.

It is a disadvantage of the known method that the geometric model of the movable body is constructed using a limited plurality of measuring points, which can lead to inaccuracies of image registration due to motion of the movable body. It is a further disadvantage of the known method that in order to obtain the geometric model of the movable body invasive means are to be used.

It is an object of the invention to provide a method of integration of medical diagnostic information and the geometric model of the movable body with improved accuracy and using non-invasive means.

To this end the method according to the invention comprises the following steps:

selecting for the first dataset results of a segmentation step of an image dataset comprising said shape and motion information, whereby said results comprise information on at least a shape of the movable body;

selecting for the second dataset a texture image dataset comprising said medical diagnostic information;

constructing the geometric model of the movable body based on said results of the segmentation step, whereby said geometric model is representative of at least a shape of the movable body;

determining a spatial correspondence information between the results of the segmentation step and the texture image dataset;

fusing the geometric model and the texture image dataset using said spatial correspondence information yielding a textured geometric model of the movable body.

The technical measure of the invention is based on the insight that a suitable image dataset, comprising information on shape of the movable body, enables a construction of a highly precise geometric model of the body to which any other suitable medical diagnostic dataset may be mapped. This mapping allows visualizing in a unified framework the spatial correspondence between shape pathologies on the one hand and physiological pathologies on the other hand. It must be noted that the term 'texture image dataset' refers to any gray or color image and is represented by a variable which takes values on any suitable grid in a multi-dimensional space, notably two-dimensional, tree-dimensional or four-dimensional and which values are represented for each point of the grid by a grey or color coding. Thus, the texture image dataset preferably comprises an intensity distribution, notable a spatial intensity distribution, of the variable. In case the intensity distribution is a two-dimensional image it can be mapped on the surface of a suitable object, or on a slice of the object. When the intensity distribution is a three-dimensional image it can be mapped on the volume of the object. The geometric model is a functional representation of a shape, whereby the contours or mesh are used. Within the terms of the invention the texture image dataset comprises a medical diagnostic information different from that of the image dataset. Due to a suitable fusion between two image datasets carrying respectively different information of the movable body, notably the heart, it is advantageous to visualize the textured geometric model, thus providing an easy means for the medical specialist for detecting possible abnormalities, like, for example, ischemic or infarcted areas of the heart. Due to this technical measure a cardiologist or any other relevant specialist is provided with fully automated means for an accurate detection of pathology.

The texture image dataset can be obtained by a suitable image-processing step of a suitable diagnostic image, for example, a contrast-enhanced magnetic resonance image. The procedure of deriving a suitable physiological parameter from the image dataset comprising medical diagnostic information is known per se in the art and will not be explained here in detail.

In accordance with the method of the invention, the geometric model of the movable body, notably the heart, is constructed using the results of a suitable image segmentation step. The procedure of the image segmentation is known per se in the art and will not be explained here in detail. The procedure of constructing a geometric model representing shape of the movable body from segmented contours of the movable body is known per se and will not be explained here in detail. In this way, when suitable image dataset comprising information on shape and motion are used for constructing the geometric model, the latter is obtained with high precision and comprises ultimately infinite number of points. If required, this domain of data may be used to construct a static geometric model, wherein motion artifacts are compensated in an accurate way.

Preferably, the step of determining the spatial correspondence between the results of the segmentation step and the texture image is implementing using per se known image registration between the image dataset and the texture image dataset. Alternatively, the image registration can be performed between the image dataset and the original medical diagnostic image dataset and from that the spatial correspondence between the image dataset and the texture dataset can be derived, since the spatial correspondence between the original medical diagnostic image dataset and the texture image dataset is known from the image-processing step. Eventually, the registration step allows establishing the spatial relation between the results of the image segmentation step and the texture image dataset. The latter can then be fused with the geometric model yielding the textured geometric model. The image registration is per se known, for example, from J. B. A. Mainz, M. A. Viergever, "A Survey of medical image registration", Medical Image Analysis, 2(1), 1998, pp. 1-36. Preferably, the step of dataset fusing is carried out using a suitable volume-rendering technique, which is per se known in the art. A plurality of physiological parameters can be derived from the second dataset and each of the parameter images can be mapped on the geometric model of the movable body using the method described above. In this embodiment, the user can choose which parameter is to be visualized as texture for the textured, animated geometric model and can switch interactively between the different textures.

In an embodiment of the method according to the invention the results of the segmentation step comprise information on the shape and the motion of said body and for the geometric model a deformable geometric model is selected representing information on the shape and the motion of said body.

This technical measure additionally solves a further problem of the prior art. In accordance with EP 1 182 619 A2, a user is provided with a static geometric model of the movable body where the motion of the movable body is compensated, thus, no medically relevant information concerning the motion of the body is available to the user. The technical measure of this embodiment solves this problem by providing a deformable geometric model, which is image-based, and onto which medical diagnostic information is mapped.

Thus, a true picture of the anatomy and the deformations undergone by the body is presented, whereby the motion is not compensated, but is accurately represented by the model. For cardiac applications, preferably, the image dataset comprises a functional image dataset, comprising information on anatomy, like a cine scan, whereas the texture image dataset is computed on the basis of a contrast-enhanced image dataset, comprising information on physiology, like a first-pass perfusion scan or a delayed enhancement scan. In this case the shape and motion information of the heart is extracted from the cine scan and the perfusion parameter derived from the contrast-enhanced scan is registered onto it. The correspondence between, for example, wall motion and perfusion status of the myocardium tissues can readily be determined. This has the advantage that a precise, spatial correspondence between shape and motion pathologies on the one hand and physiological pathologies on the other hand is established and is presented to the clinician in a suitable form, easy to visualize. This technical measure ensures an easy data analysis by a medical specialist.

Different parameterization methods can be used to construct a geometric model representing shape and motion of the body. A first method consists is using shape parameters only. With that method, the motion of the object can be represented by using for each time instant of the motion different shape parameters. With that method, the motion information is represented only implicitly; for example, a displacement field characterizing this motion can be computed as the difference between two consecutive shapes. Alternatively, with a second method, the geometric model is made of both shape and motion parameters. In that case, the shape parameters represent a particular instance of the body, for example at the beginning of the motion, and the motion parameters describe how to deform this initial shape. For example, in the cardiac case, the shape parameters enable to represent the shape of the myocardium at the end-diastolic phase, and the motion parameters include contraction and rotation coefficients. With that method, which is the preferred method, a continuous representation of the motion can be done. Different parameterization methods for constructing shape and motion models are known per se, examples being described in A. Matheny, D. B. Goldgof, "The Use of Three- and Four-Dimensional Surface Harmonics for Rigid and Nonrigid Shape Recovery and Representation", IEEE Transactions on Pattern Analysis and Machine Intelligence, 17(1), 1995, pp. 967-981.

In a further embodiment of the method according to the invention, for the movable body a body with pre-determined shape and/or motion parameterization is selected, the method further comprising the step of segmenting the image dataset using said shape an/or motion parameterization.

It is found to be particularly preferable to use so-called model-based segmentation methods for bodies which shape and/or motion is pre-known. This technical measure is based on the insight that in accordance with some recent advances in medical image processing, the step of segmenting the contours of a body of interest in acquired image dataset can be performed automatically on the basis of a multi-dimensional geometric model of the body. Such a model is made of a set of parameters, for example coordinates of the nodes of a mesh, coordinates of anatomical landmarks, or the coefficients of some basis functions, describing the contours, surfaces or volumes of the body of interest. For example, the segmentation of the cardiac surfaces in a cine scan acquired with a Magnetic Resonance Imaging scanner can be performed automatically on the basis of a four-dimensional model of the myocardium, the latter being made of parameters describing the shape and the motion of the endocardial and epicardial surfaces of the left and/or right ventricle. The model-based segmentation consists in finding the optimal parameters according to the image dataset and possibly some prior information on the shape and the motion of the myocardium. A review of model-based image segmentation techniques based on multi-dimensional geometric models are described in T. McInerney, D. Terzopoulos, "Deformable models in medical image analysis: a survey", Medical Image Analysis, 1(2), 1996, pp. 91-108. One example of model-based segmentation method for cardiac cine scans of Magnetic Resonance Images can be found in J. Sénégas, T. Netsch, C. A. Cocosco, G. Lund, A. Stork, "Segmentation of medical images with a shape and motion model: A Bayesian perspective", Lecture Notes in Computer Sciences 3117, 2004, pp. 157-168. When the model-based segmentation is fulfilled the geometric model is constructed by combining the thus optimized parameters of the model.

In a still further embodiment of the method according to the invention, the determination of the spatial correspondence is obtained by segmenting the texture image dataset using the shape and/or motion parameterization of the movable body.

It is found to be particularly advantageous to segment the texture image dataset with a model-based segmentation technique using the same shape and/or motion parameterization, as was applied for segmenting the image dataset and constructing the geometric model. In accordance with this procedure, the spatial correspondence between the texture dataset and the geometric model of the body is directly obtained. Alternatively, in case the original medical diagnostic data are available, they may be accessed and may be segmented instead of segmenting the texture image dataset using the same shape and/or motion parameterization as was applied for segmenting the image dataset comprising information on shape and/or motion of the movable body. This has the further advantage that inaccuracies stemming from the registration step as described above can be reduced.

In still further embodiment of the method according to the invention, the method further comprises a step of visualizing the textured geometric model on a display means. This visualization step comprises preferably the use of a color-coding scheme to represent the texture and the use of a cine mode that shows the animated textured geometric model in a loop mode in case the used geometric model is deformable.

In a still further embodiment of the method according to the invention, the method further comprises the steps of:

further segmenting regions of the textured geometric model in accordance with a pre-determined criterion to yield regions of interest;

displaying regions of interest on the display means.

This technical measure is considered to be a further advantageous aid for the medical specialist in his search for possible abnormalities in the images. Preferably, the criterion is determined as a certain threshold value in, for example, pixel values of texture, upon which, or, alternatively, below which the pixel is considered to belong to an area of abnormalities. The criterion can also be based on the computation of a local shape parameter like curvature, thickness, etc, or a local motion parameter like total displacement, displacement velocity, etc. In cardiac applications, such a criteria can be a perfusion status value described by a slope parameter or a wall thickening value. The criterion can also be made of a combination of criteria of the like. It is possible to set a scale of criteria in accordance with a degree of severity of abnormalities. Preferably, the region of interest is colored, in case a plurality of criteria is pre-defined, the region of interest is color-coded in accordance with a predefined order, for example a rainbow-like order. Additionally, it is possible to provide a quantitative information in the volume of the region of interest in real dimensions. Due to this technical measure it is ensured that the medical specialist does not overlook the region of abnormality irrespective how tiny it may be. A provision of a quantitative information about the volume of the region of interest, when required per scale, is a valuable aid to the medical specialist in setting out his diagnosis and/or prognosis for the patient under consideration. For cardiac application it may be of paramount importance.

In a still further embodiment of the method according to the invention, the method further comprises the step of acquiring using a data acquisition means the image dataset and a further image dataset, whereby the further image dataset is used to obtain the texture image dataset.

It is considered to be advantageous to provide a fully embedded application, whereby the trajectory from a data acquisition step to a data analysis step is fully automated. For cardiac applications, it is advantageous that the data analysis is carried out practically instantly, improving the workflow at the department. Preferably, for cardiac applications a per se known magnetic resonance imaging apparatus is used for acquisition of the image dataset and the further image dataset. However, it is possible to use other imaging means to acquire one or all of the two image datasets, for example a CT scanning means, a PET scanning means or a SPECT scanning means. Preferably, the further image dataset is acquired after injection of a contrast agent that allows to reveal the physiological status of the movable body.

A system for enabling an integration of medical diagnostic information and a geometric model of a movable body according to the invention comprises:

an input for:
i) accessing the first dataset comprising results of a segmentation step of the image dataset, whereby said results comprise information on a shape of the movable body;
ii) accessing the second dataset comprising a texture image dataset;
a computation unit for:
i) constructing the geometric model of the movable body based on said results of the segmentation step, whereby said geometric model is representative of at least a shape of the movable body;
ii) determining a spatial correspondence between the image dataset and the texture image dataset;
iii) fusing the geometric model and the texture image dataset using the said spatial correspondence, yielding a textured geometric model of the movable body.

a storage unit for storing the textured geometric model of the movable body.

Preferably, the system according to the invention is further arranged for automated dynamic information fusion, whereby a deformable geometric model is constructed based on the image dataset comprising information on shape and motion of the movable body. Still preferably, the deformable geometric model is constructed using a suitable shape and/or motion parameterization, as is set forth in the foregoing with reference to the method according to the invention. Still preferably, the system according to the invention further comprises a display for displaying the textured, and, alternatively textured animated geometric model. Still preferably, the system according to the invention further comprises a color-coding scheme for displaying the textured, animated geometric model of the movable body. Still preferably the system according to the invention still further comprises an acquisition unit for acquiring the image dataset and a further image dataset conceived to be used to yield textured dataset.

A computer program according to the invention comprises instructions for a suitable processor for causing the processor to carry out the steps of the method as is set forth in the foregoing.

These and other aspects of the invention will be discussed in further detail with reference to figures.

FIG. 1 presents in a schematic way an embodiment of the system according to the invention.

Figure 2:
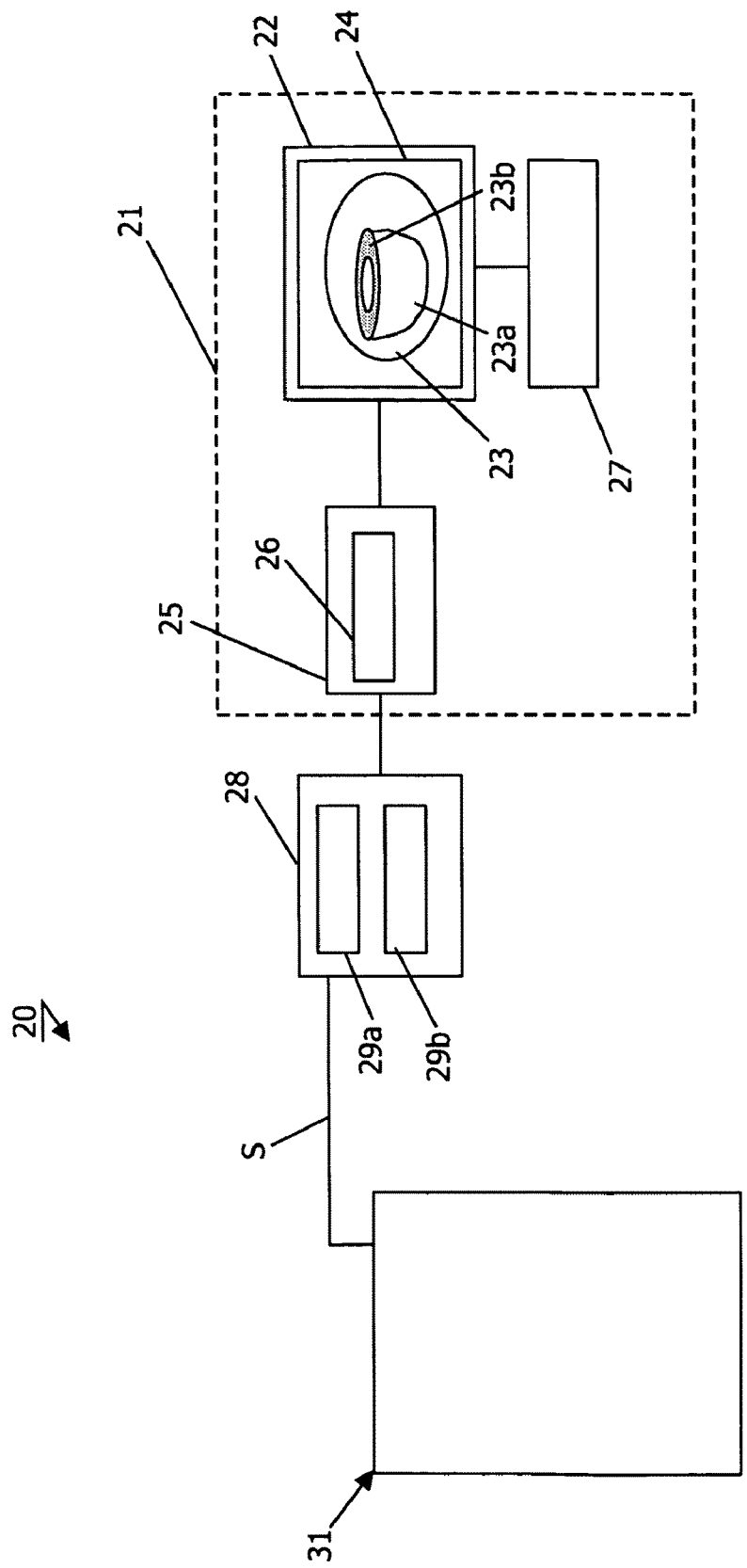

FIG. 2 presents in a schematic way a further embodiment of the system according to the invention.

Figure 3:
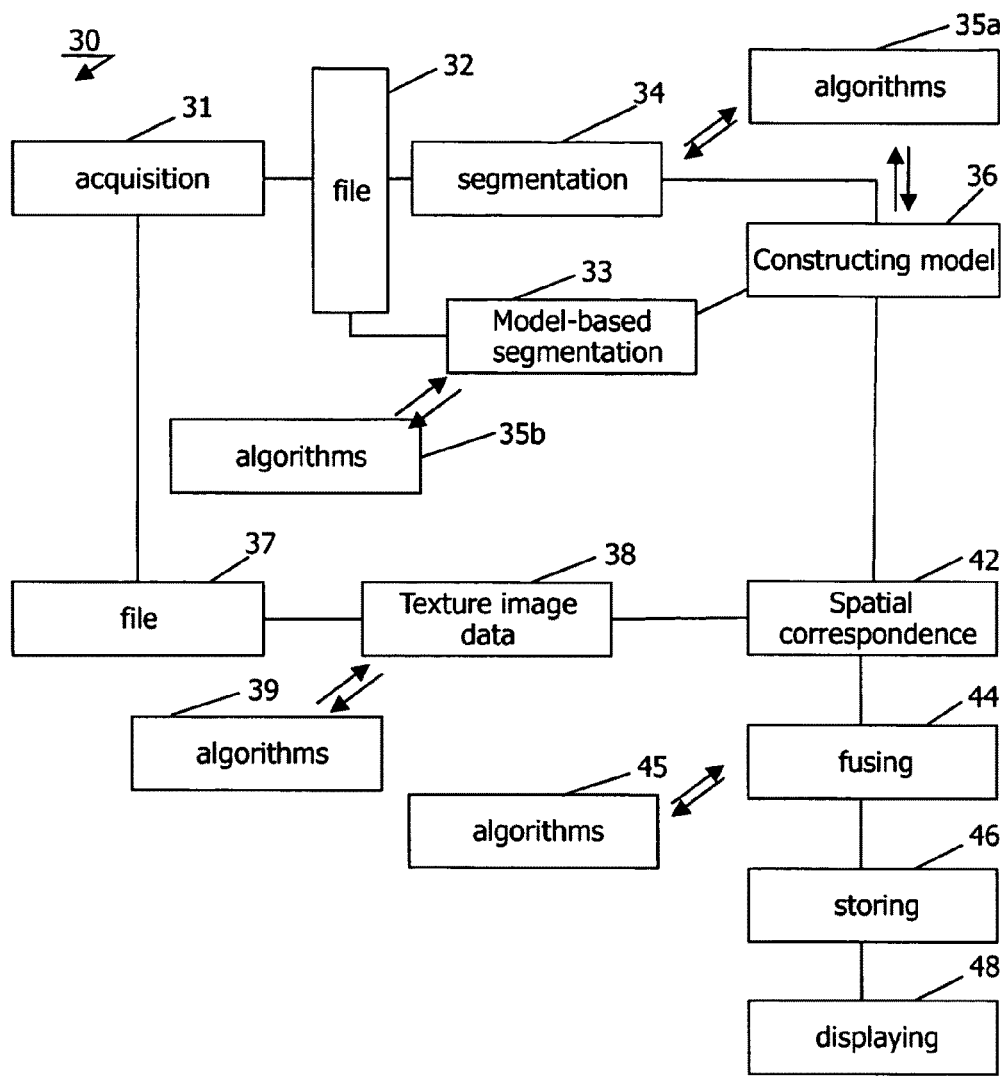

FIG. 3 presents in a schematic way an embodiment of a flow-chart of the method according to the invention.

Figure 4:
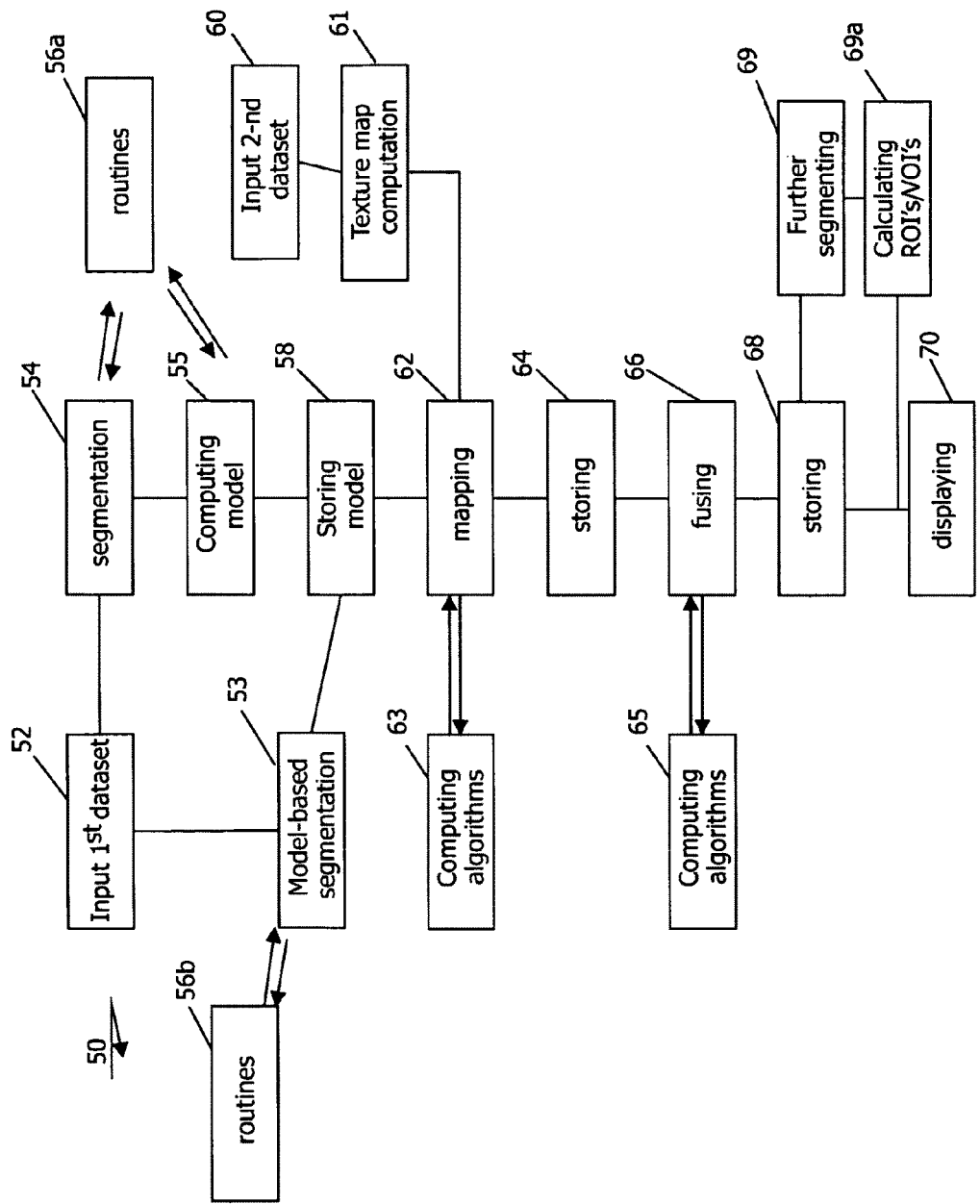

FIG. 4 presents in a schematic way an embodiment of a flow-chart of the computer program according to the invention.

Figure 5:
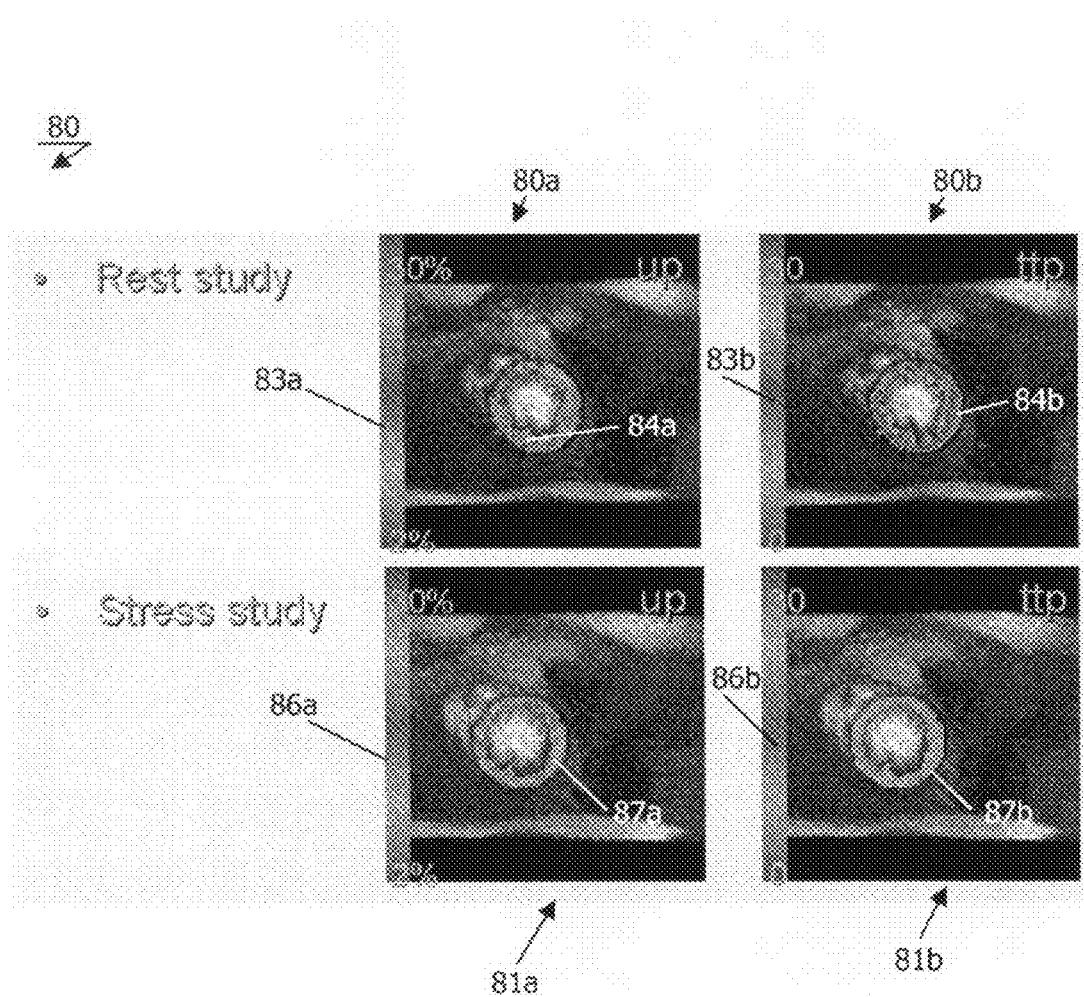

FIG. 5 presents in a schematic way an embodiment of cardiac perfusion dataset that can be used as texture dataset.

Figure 6:
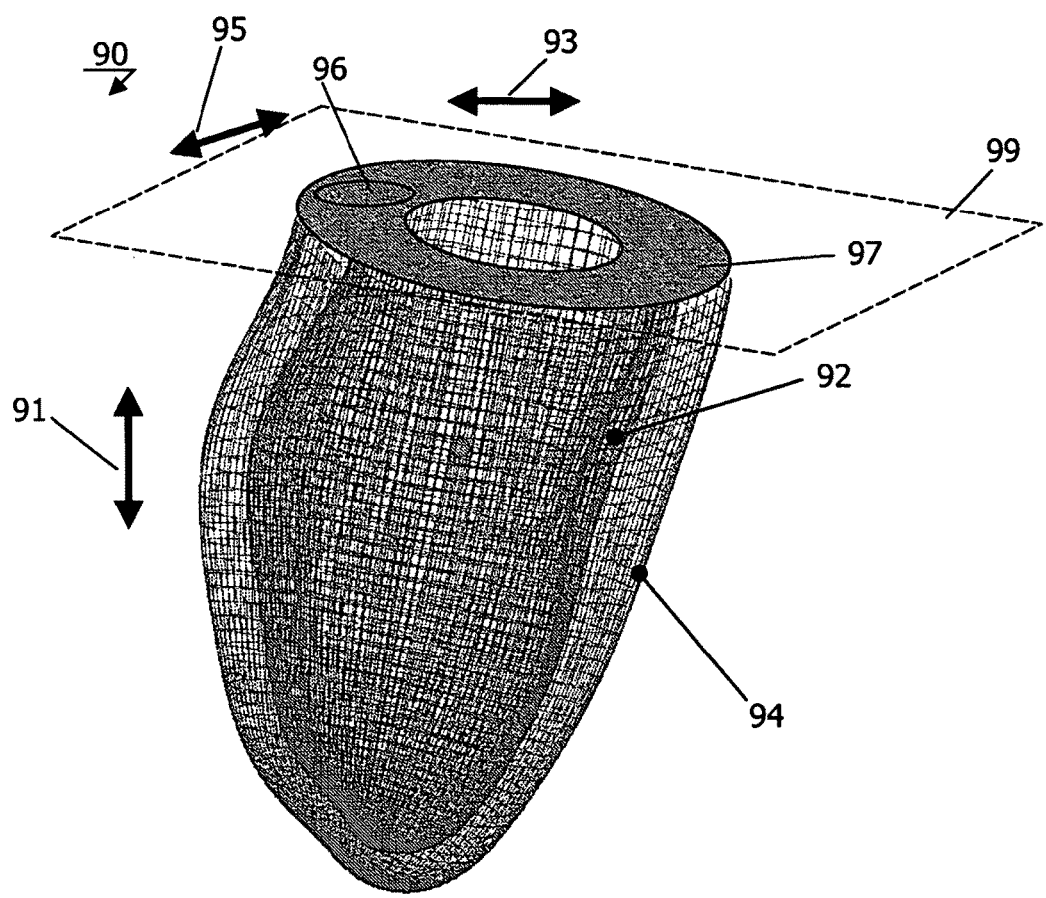

FIG. 6 presents in a schematic way an embodiment of a constructed geometric model of the heart.

FIG. 1 presents in a schematic way an embodiment of the system according to the invention. The system 10 comprises an input 2 for accessing results of a segmentation step of the image dataset as well as for accessing the second dataset being the texture image dataset. The segmentation step as well as processing a suitable medical diagnostic data yielding texture image dataset may be carried out on a different hardware, or, alternatively it may be implemented as a preparatory step for practicing the invention using the same hard-ware. In the latter case, the input 2 may be arranged to receive the results in any suitable form. For example, the apparatus 10 may be involved in the acquisition of the suitable data. In this case the all necessary datasets, like cine scan and contrast-enhanced scan for cardiac imaging, may be acquired in an analogue form and converted using a suitable A/D converter to a digital form for further processing. The datasets may also be received in a digital form, e.g. through a direct acquisition thereof in a digital form or via a computer network after having been acquired by another computer/medical instrument. The image dataset is then made available by the input 2 to a computing unit 5 of the system 10, which is arranged to carry out the image segmentation and the image processing steps yielding the geometry of the movable body and the texture image dataset. These steps are implemented using per se known respective computing algorithms 5b and 5c.

The core of the system 10 is formed by a processor 4 which is arranged to operate the components of the system 10, it being the input 2, the computing unit 5, a working memory 6, a background storage unit 8. An example of a suitable processor 4 is a conventional microprocessor or signal processor, a background storage 8 (typically based on a hard disk) and working memory 6 (typically based on RAM). The background storage 8 can be used for storing suitable datasets (or parts of it) when not being processed, and for storing results of the image segmentation step, the step of determining spatial correspondence information and results of any other suitable intermediate or final computational steps. The working memory 6 typically holds the (parts of) dataset being processed and the results of the constructing of the geometric model of the movable body and the data fusion yielding textured, preferably animated geometric model of the movable body. The computing unit 5 preferably comprises a suitable number of executable subroutines 5a, 5b, 5c, 5d, 5e, and 5f. The subroutine 5a is arranged to construct the geometric model of the movable body based on the results of the segmentation step. Subroutine 5b is arranged to carry out image segmentation step. Depending on implementation, the subroutine 5b may preferably comprise a pre-defined geometric model of the movable body, notably the heart. The subroutine 5c is arranged to process suitable medical diagnostic data to yield texture image dataset. The subroutine 5d is arranged to determine spatial correspondence between the geometric model and the texture image dataset. The subroutine 5e is arranged to fuse the geometric model and the texture image dataset yielding the textured geometric model of the movable body. The subroutine 5f is arranged to further segment the textured geometric model in accordance with a pre-selected criterion (not shown) to yield a region of interest.

The apparatus 10 according to the invention further comprises a coder 7 arranged to code the determined region of interest in accordance to a pre-selected criterion. Preferably, the criterion is determined as a certain threshold value in, for example, pixel values of texture, upon which, or, alternatively, below which the pixel is considered to belong to an area of abnormalities. The criterion may be selectable from a list of valid criteria, stored in a file 7a. The coder is arranged to assign a suitable coding value to a region of selected pixels which fall within the range of pre-determined criteria 7a. Preferably, the coder 7, the computing unit 5 and the processor 4 are operable by a computer program 3, preferably stored in memory 8. An output 9 is used for outputting the results of the processing, like fused image data representing the textured, preferably animated geometric model of the movable body.

FIG. 2 presents a schematic view of a further embodiment of the system 20 according to the invention. The system 20 is arranged for enabling an integration of medical diagnostic information and a geometric model of a movable body based on the image dataset 29a and the further image dataset 29b of the movable body whereas, said both image datasets are acquired using a data acquisition unit 31, notably a magnetic resonance imaging apparatus. The further image dataset 29b is conceived to be suitably processed to yield texture image dataset.

The output of the processor 28 comprises the fused data representing the textured, preferably animated geometric model of the movable body, obtained in accordance with the method of the invention as is set forth in the foregoing. Preferably, the textured, preferably animated geometric model comprises a region of interest, which is color coded to ease a detection thereof in the image. Still preferably, quantitative data about a volume of the region of interest is provided as well, stored, for example in a suitable file. The output of the processor 28 is made available to a further input 25 of a suitable viewer 21. Preferably, the further input 25 comprises a suitable further processor arranged to operate a suitable interface using a program 26 adapted to control a user interface 24 so that an image of the textured, preferably animated geometric model 23 is visualized, comprising a graphic representation of fused shape and preferably motion information data 23a and physiological data 23b. Preferably, the textured, animated geometric model is displayed with a color-coding scheme to ease detection of pathologies. Still preferably, in case when for the geometric model a deformable geometric model is used, the resulting textured image data is presented in a loop. Still preferably, a plurality of texture image data is created based on a medical diagnostic data, whereby the texture image dataset, conceived to be currently used, is user-selectable from said plurality. Preferably, for user's convenience, the viewer 21 is provided with a high-resolution display means 22, the user interface being operable by means of a suitable interactive means 27, for example a mouse, a keyboard or any other suitable user's input device. Preferably, the user interface allows the user to choose and interactively change the criteria for computing the region of interest. It also allows interactively switching between different a plurality of texture images, if more than one are available.

FIG. 3 presents in a schematic way an embodiment of a flow-chart of the method according to the invention. In accordance with the method of the invention, at step 34 a suitable image segmentation step of a suitable image dataset 32, like cine image or any other image comprising information on the shape and motion of the movable body is performed. Preferably, the image dataset 32 is stored in a suitable file following a data acquisition using a suitable imager 31. It is assumed that the first image dataset 32 comprises information on a deformation of the body's geometry due to motion. For cardiac applications a moving heart is selected for the movable body, whereby geometries comprise endocardial and epicardial surfaces of the left and/or right ventricle. After the results of the suitable segmentation step are accessed, a geometric model of the movable body is constructed at step 36. Suitable computation algorithms 35a are used therefore. Preferably, the geometric model is represented by means of a set of point coordinates, notably the nodes of a mesh or a set of anatomical landmarks, a decomposition using a basis of surface harmonics functions or splines. Alternatively, the geometric model is constructed from the first image dataset 32 by carrying out a model-based segmentation step 33. Suitable computation algorithms 35b are used therefore, which optimize parameters of a pre-defined geometric model of the movable body. In this case, at step 36 the geometric model is constructed based on the optimized parameters obtained at step 33. At step 38 the texture image dataset is accessed, preferably from a file 37 which is created after a suitable data acquisition step 31, and processed to compute a medical diagnostic parameter image and yield a texture image dataset. For cardiac applications the suitable data acquisition step for the image dataset may comprise a cine acquisition, whereas for the medical diagnostic image data it may comprise a contrast-enhanced acquisition. At step 42 in accordance with the method of the invention, a spatial correspondence is determined between the texture image dataset, that is output at step 38, and the geometric model, which represents deformation of the body due to motion. Due to the step 38 the texture image dataset acquires corresponding coordinates to make it possible to automatically combine the shape and motion information extracted from the image dataset and the physiological information extracted from the texture image dataset. At step 44 the geometric model and the texture image dataset are fused into a textured, preferably animated deformable geometric model of the body. The results of the fusion step are stored at step 46. The fused data provides information about the texture of the body, notably a degree of perfusion for cardiac applications, which is superposed on the geometric model of the moving body, notably the heart. Preferably, at step 48 the fused data is displayed on a suitable display means, preferably with a color-coding scheme, for a specialist's investigation. Preferably, the fused data is displayed by means of a suitable volume rendering technique. Optionally, the fused data may be subjected to a further image segmentation step, whereby volume of interests may be automatically determined which meet certain pre-determined criteria. For example, a threshold value for an allowable degree of perfusion or wall thickening may be pre-set. In this case voxels failing beyond this threshold are automatically identified as areas of possible abnormality. This feature ensures that all volumes of insufficient perfusion or wall thickening are detected, irrespective of their absolute dimension. Still preferably, the corresponding absolute data on volumes of the areas of thus determined insufficient perfusion or wall thickening is automatically quantified.

FIG. 4 presents in a schematic way a flow-chart of the computer program 50 according to the invention. The computer program 50 is arranged to cause a processor to carry out the steps of the method as is set forth in the foregoing. To this end, at step 52 the image dataset is accessed and the segmentation of the contours of the movable body is carried out at step 54. Preferably, the computer program 50 comprises the image segmentation step 54. At step 55 a geometric model of the movable body is determined, whereby use is made of suitable computation routines 56a. Alternatively, at step 53, the image dataset is accessed by a model-based segmentation sub-program that optimizes parameters of a pre-defined geometric model of the movable body, whereby use is made of suitable computation routines 56b. Preferably, the geometric model is represented using coordinates of points like the nodes of meshes or anatomical landmarks, surface harmonics or splines. At step 60 the second dataset is accessed and processed to yield a texture image dataset of a suitable physiological parameter at step 61. This texture image dataset is mapped to the geometric model at step 62 by using suitable computation algorithms 63. In case the texture image dataset is represented by a two-dimensional image, it is mapped on a surface of the geometric model or on a slice within the geometric model. In case the texture image dataset is represented by a three-dimensional image, it is mapped on the volumetric geometrical model using suitable volume rendering technique. Preferably, for the computation algorithms 63 a segmenting step using the same model as for segmenting the first image dataset is used, or a registering operation of the image dataset and the texture image dataset. At step 64 the results of the step of determining a spatial correspondence between the geometric model and the texture image dataset are stored in an accessible file 64. At step 66 the texture image dataset is fused with the geometric model of the movable body using the spatial correspondence therebetween to yield the textured, preferably deformable geometric model which in the latter case represents both the shape and motion of the body and information on the physiological status of the body, notably degree of perfusion for cardiac applications. The results of the fusion step are stored at step 68. Preferably, at step 69 the fused data is subjected to a further image segmentation, whereby volumes of, for example, insufficient perfusion or wall thickening are automatically identified. Still preferably, at step 69*a* the corresponding volumes are calculated. At step 70 the fused image data, which may comprise detected volume of interests, is displayed on a suitable display means, preferably by means of a suitable volume rendering technique.

FIG. 5 presents in a schematic way an embodiment of cardiac perfusion data that can be used as texture image dataset. The perfusion data comprise two series of perfusion datasets: 80*a*, 80*b* during a rest study and 81*a*, 81*b* during a stress study. For each study, two physiological parameters ("up" and "ttp") were derived, each one yielding a texture image: 84*a*, 84*b*, 87*a* and 87*b*. Preferably, the texture image dataset is color-coded to ease an analysis of the dataset by a medical specialist. The corresponding readings of the color code are presented as rainbow shades 83*a*, 83*b*, 86*a*, 86*b*. Preferably the color scales are accompanied by absolute values.

An exemplary embodiment of a constructed geometric model of the heart is shown in FIG. 6. The geometric model 90 comprises segmented surfaces of epicardium 94 and endocardium 92. Preferably, the geometric model 90 is deformable at least in one of the three orthogonal directions 91, 93, and 95. Texture image dataset 97, being suitably fused with the geometric model 94, 92 of the epicardium and endocardium surfaces, is shown at a user-selectable cross-section 99. Preferably, the deformation of the deformable model is animated and is visualized in a looped mode. Still preferably, the available cross-sections are deformed and visualized accordingly. Still preferably a region of interest 96 is automatically detected in accordance with the method of the invention as is set forth in the foregoing, and is visualized accordingly.

The invention claimed is:

1. A method for integration of medical diagnostic information and a geometric model of a movable body based on a first dataset comprising shape and motion information about the movable body and a second dataset comprising medical diagnostic information about the movable body, said method comprising the steps of:
    selecting for the first dataset results of a segmentation step of an image dataset comprising said shape and motion information, whereby said results comprise information on at least a shape of the movable body;
    selecting for the second dataset a texture image dataset comprising said medical diagnostic information;
    constructing the geometric model of the movable body based on said results of the segmentation step, whereby said geometric model is representative of at least a shape of the movable body;
    determining a spatial correspondence information between the results of the segmentation step and the texture image dataset;
    fusing the geometric model and the texture image dataset using said spatial correspondence information yielding a textured geometric model of the movable body.

2. A method according to claim 1, wherein the results of the segmentation step comprise information on the shape and the motion of said body, and whereby for the geometric model a deformable geometric model representative of the shape and the motion of said body is selected.

3. A method according to claim 1, wherein the method further comprises the step of:
    segmenting the image dataset yielding said information on at least the geometry of the movable body.

4. A method according to claim 3, wherein for the movable body a body with pre-determined shape and/or motion parameterization is selected, the method further comprising the step of:
    segmenting the image dataset using said shape and/or motion parameterization.

5. A method according to claim 4, wherein the determination of the spatial correspondence is obtained by segmenting the texture image dataset using the shape and/or motion parameterization of the movable body.

6. A method according to claim 3, said method further comprises the step of:
    visualizing an animated textured geometric model on a display means.

7. A method according to claim 1, said method further comprising the step of:
    visualizing the textured geometric model on a display means.

8. A method according to claim 1, wherein the method further comprises the step of:
    further segmenting regions of the textured geometric model in accordance with a pre-determined criterion to yield regions of interest;
    displaying regions of interest on the display means.

9. A method according to claim 1, whereby for the movable body a beating heart is selected, and whereby the information on the geometry of the beating heart comprises information on the geometry of myocardium.

10. A method according to claim 1, whereby for second dataset comprising medical diagnostic information about the movable body a texture image derived from a contrast-enhanced scan is selected.

11. A method according to claim 1, said method further comprising a step of:
    acquiring using a data acquisition means the image dataset and a further image dataset, whereby the further image dataset is used to obtain the texture image dataset.

12. A system according to claim 11, said system further comprising a display for displaying the textured geometric model.

13. A system according to claim 11, whereby the computation unit is further arranged to compute a deformable geometric model based on the image dataset, whereby for the deformable geometric model a deformable geometric model representative of the shape and the motion of the body is selected.

14. A system according to claim 13, whereby said system further comprises a display for displaying the deformable, preferably animated geometric model.

15. A system for enabling an integration of medical diagnostic information and a geometric model of a movable body based on a first dataset comprising shape and motion information about the movable body and a second dataset comprising medical diagnostic information about the movable body, said system comprising:

an input for:
- i) accessing the first dataset comprising results of a segmentation step of the image dataset, whereby said results comprise information on a shape of the movable body;
- ii) accessing the second dataset comprising a texture image dataset;

a computation unit for:
- i) constructing the geometric model of the movable body based on said results of the segmentation step, whereby said geometric model is representative of at least a shape of the movable body;
- ii) determining a spatial correspondence between the image dataset and the texture image dataset;
- iii) fusing the geometric model and the texture image dataset yielding a textured geometric model of the movable body;

a storage unit for storing the textured geometric model of the movable body.

16. A system according to claim 15, said system further comprising a data acquisition unit for acquiring the image dataset and a further image dataset, said further image dataset being conceived to be used to yield the texture image dataset.

17. A computer program stored on a non-transitory computer readable medium for integration of medical diagnostic information and a geometric model of a movable body based on a first dataset comprising shape and motion information about the movable body and a second dataset comprising medical diagnostic information about the movable body, said computer program comprising instructions for causing a processor to carry out the steps of:

accessing for the first dataset an image dataset comprising said shape and motion information, whereby said results comprise information on at least a shape of the movable body;

accessing for the second dataset a texture image dataset comprising said medical diagnostic information;

constructing the geometric model of the movable body based on said results of the segmentation step, whereby said geometric model is representative of at least a shape of the movable body;

determining a spatial correspondence information between the results of the segmentation step and the texture image dataset;

fusing the geometric model and the texture image dataset using said spatial correspondence information yielding a textured geometric model of the movable body.

18. A computer program according to claim 17, wherein the results of the segmentation step comprise information on the shape and the motion of said body, and whereby the computer program further comprises an instruction for the processor to carry out the step of:

compute a deformable geometric model representative of the shape and the motion of said body based on said shape and motion information.

19. A computer program according to claim 17, whereby the computer program comprises a further instruction for the processor to carry out the step of:

segmenting the image dataset yielding said shape/or shape and motion information of the movable body.

* * * * *